(12) United States Patent
Weinstein et al.

(10) Patent No.: US 8,938,226 B2
(45) Date of Patent: Jan. 20, 2015

(54) REASSIGNED MOBILE MESSAGE NOTIFICATIONS

(71) Applicant: Cellco Partnership, Basking Ridge, NJ (US)

(72) Inventors: Julie Weinstein, West Nyack, NY (US); Meera Deshpande Kumarjiguda, Edison, NJ (US); Shankar Kulkarni, Bridgewater, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/064,955

(22) Filed: Oct. 28, 2013

(65) Prior Publication Data

US 2014/0057622 A1 Feb. 27, 2014

Related U.S. Application Data

(63) Continuation of application No. 12/712,804, filed on Feb. 25, 2010, now Pat. No. 8,571,525.

(51) Int. Cl.
*H04M 3/00* (2006.01)
*H04W 4/00* (2009.01)
*H04W 8/24* (2009.01)
*H04W 4/12* (2009.01)

(52) U.S. Cl.
CPC ............ *H04W 4/001* (2013.01); *H04W 8/245* (2013.01); *H04W 4/12* (2013.01)
USPC ...................................................... 455/419

(58) Field of Classification Search
USPC ................................ 455/418, 419
See application file for complete search history.

(56) References Cited

U.S. PATENT DOCUMENTS

| | | |
|---|---|---|
| 7,716,276 B1 | 5/2010 | Ren et al. |
| 7,774,431 B2 | 8/2010 | Conn et al. |
| 7,779,408 B1 | 8/2010 | Papineau |
| 2002/0069259 A1 | 6/2002 | Kushwaha et al. |
| 2003/0065738 A1 | 4/2003 | Yang et al. |
| 2005/0240925 A1 | 10/2005 | Ault et al. |
| 2006/0031399 A1 | 2/2006 | Sherman et al. |
| 2006/0227727 A1 | 10/2006 | Semper |
| 2007/0002129 A1 | 1/2007 | Benco et al. |
| 2008/0244704 A1 | 10/2008 | Lotter et al. |

(Continued)

FOREIGN PATENT DOCUMENTS

| | | |
|---|---|---|
| EP | 2 129 146 A1 | 12/2009 |
| GB | 2 380 356 A | 4/2003 |

OTHER PUBLICATIONS http://www.cnn.com/2009/TECH/06/08/apple.iphone.wwdc/index.html.
http://www.apple.com/mobileme/whats-new/, Feb. 24, 2010.
John D. Sutter, "Stronger, faster iPhone 3GS will hit stores," CNN.com, <http://cnn.site.printthis.clickability.com>, Feb. 24, 2010.
<http://www.apple.com/mobileme/whats-new/, Feb. 24, 2010.

(Continued)

*Primary Examiner* — Joel Ajayi

(57) ABSTRACT

The instant application describes examples of managing a customer's mobile station and providing a notification of a resultant change. The disclosed examples provide for a subscriber device management application that executes on a customer's mobile device that allows changes to be made remotely to an operational control parameter of mobile station. In response to a change to the operation control parameter, a notification may be sent as a mobile messaging service message to a mobile station other than the customer's mobile station.

16 Claims, 9 Drawing Sheets

(56) References Cited

U.S. PATENT DOCUMENTS

2009/0197596 A1   8/2009   Wahler et al.
2010/0279652 A1   11/2010  Sharp et al.

OTHER PUBLICATIONS

European Search Report issued in European Patent Application No. 11001593.0-2414, mailed Jun. 8, 2011.

Entire prosecution history of U.S. Appl. No. 12/712,804, entitled "Reassigned Mobile Message Notifications," filed Feb. 25, 2010.

SAMPLE REQUEST FROM THE FRONT END FOR THE LOCK OPERATION

```
<SDMRequest>
    <Message-Header>
        <ORIGINATING_SYSTEM>IVR</ORIGINATING_SYSTEM>
        <REQUEST_ID>IVR0123456789abcdef</REQUEST_ID>
        <OPERATION>LOCK_DEVICE</OPERATION>
        <ORIG_DATE_TIME>1/23/2009 9:27:26</ORIG_DATE_TIME>
        <ASYNCHRONOUS>Y</ASYNCHRONOUS>
    </Message-Header>
    <Message-Data>
        <MDN>9085551212</MDN>
        <MIN>9085551212</MIN>
        <ESN_MEID>13800001234</ESN_MEID>
        <USER_ID>STANKKK</USER_ID>
        <ACCOUNT_NUMBER>601962556-00001</ACCOUNT_NUMBER>
        <BILLING_SYSTEM>VISION_EAST</BILLING_SYSTEM>
        <COMM_MDN>9085555555</COMM_MDN>
        <LANG_IND>E</LANG_IND>
        <COMM_EMAIL>smith@verizonwireless.com</COMM_EMAIL>
        <ALERT_USER>Y</ALERT_USER>
        <ALERT_TEXT>Please Confirm by pressing # </ALERT_TEXT>
        <CONSUMER>Y</CONSUMER>
    </Message-Data>
</SDMRequest>
```

PLEASE NOTE THAT SMS TEXT IS SEND TO THE MDN PROVIDED IN THE <COMM_MDN> AND EMAIL IS SENT TO THE EMAIL ADDRESS PROVIDED IN THE <COMM_EMAIL> ELEMENT.

SAMPLE RESPONSE TO THE FRONT END REQUEST FROM ITESB

```
<SDMResponse>
    <Message-Header>
        <REQUEST_ID>IVR0123456789abcdef</REQUEST_ID>
        <OPERATION>LOCK_DEVICE_PARTIAL</OPERATION>
        <RESPONSE_DATE_TIME>1/23/2009 9:27:26</RESPONSE_DATE_TIME>
    </Message-Header>
    <Message-Data>
        <ErrorCode>0</ErrorCode>
        <ErrorText>Request queued successfully</ErrorText>
    </Message-Data>
</SDMResponse>
```

FIG. 6A

SAMPLE SMS TEXT MESSAGE SENT TO THE CUSTOMER AFTER THE OPERATION IS COMPLETED

VZW Free Msg: SDM Lock has succeeded for mobile number ending with 5555.

FIG. 6B

REASSIGNED MOBILE MESSAGE NOTIFICATIONS

This application is a continuation of U.S. patent application Ser. No. 12/712,804, filed Feb. 25, 2010, now U.S. Pat. No. 8,571,525, granted Oct. 29, 2013, the disclosure of which is expressly incorporated herein by reference.

TECHNICAL FIELD

The present subject matter relates to techniques and equipment to interact over the air with an application on a customer's mobile station to remotely change a parameter of operation of the mobile station, e.g. to disable the mobile station and lock down the customer's personal data stored therein, and to provide a mobile messaging service notification of the parameter change to another identified mobile station, such as another station on the same mobile service account.

BACKGROUND

Advanced Devices (e.g., PDAs and Smartphones with open OS) are becoming more poplar in both Consumer (including SMB) and Enterprise domains. It ha been predicted that this market segment will continue to experience double-digit growth for the next 5 years. The Advanced Devices are playing a more important role in the everyday life or a Consumer, Enterprise, Federal, and Government user.

As Advanced Devices are getting more popular, the complexity of reported problems, the number of support calls, and support call durations on those devices continue to increase significantly, it is critical for a Mobile. Service Provider (e.g., Verizon Wireless™) to provide improved customer support and customer satisfaction more cost effectively.

Indeed, there is a need to reduce support cost and increase customer satisfaction with setup and troubleshooting experience associated with the Advanced Devices problems by providing the necessary tools to the support teams in assisting to troubleshoot device configuration issues efficiently. Specifically there is a need to enable remote management of a mobile station (e.g., change the operational control parameters of the station over the air) and to provide a notification of the change to the user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

SUMMARY

The technologies described herein enable management of a mobile station, e.g., to change an operating parameter of the station over the air, and to provide an associated notification of the change. For example, the instant application describes a method of managing a customer's mobile station and providing a notification of a resultant change. The method includes steps of communicating over the air through a mobile communication network with a subscriber device management application running on the customer's mobile station; causing the subscriber device management application to attempt to change an operational control parameter of the customer's mobile station, via the over the air communication; and determining an outcome of the attempted change of the operational control parameter of the customer's mobile station. The method also includes a step of sending a mobile messaging service message, providing notification of the attempted change of the operational control parameter of the customer's mobile station, through the mobile communication network to another mobile station associated with the customer.

The more specific examples in the detailed description may include one or more of the following features. Determining the outcome of the attempted change of the operational control parameter of the customer's mobile station may include determining that the attempted change of the operational control parameter of the customer's mobile station was successful. The attempted change of the operational control parameter of the customer's mobile station may lock the customer's mobile station. The locking of the customer's mobile station may prevent access to personal data of the customer stored in the customer's mobile station. Alternatively or additionally, the attempted change of the operational control parameter of the customer's mobile station may turn a built-in camera of the mobile station On or Off. Alternatively or additionally, the attempted change of the operational control parameter of the customer's mobile station may turn a Wi-Fi capability of the mobile station On or Off. Alternatively or additionally, the attempted change of the operational control parameter of the customer's mobile station may be directed toward troubleshooting the mobile station. Alternatively or additionally, the attempted change of the operational control parameter of the customers mobile station wipes out the content of the mobile station. The wiping out of the content of the customer's mobile station prevents access to personal data of the customer stored in the customer's mobile station. Determining the outcome of the attempted change of the operational control parameter of the customer's mobile station may include determining that the attempted change of the operational control parameter of the customer's mobile station was unsuccessful.

In another general aspect, the instant, application describes a host system for managing a customer's mobile station and providing a notification of a resultant change. The host system includes a processing device; and a memory storing executable instructions for causing, the processing device to communicate over the air through a mobile communication network with a subscriber device management application running on the customer's mobile station; cause the subscriber device management application to attempt to change an operational control parameter of the customer's mobile station, via the over the air communication; determine an outcome of the attempted change of the operational control parameter of the customer's mobile station; and send a mobile messaging service message, providing notification of the attempted change of the operational control parameter of the customer's mobile station, through the mobile communication network to another mobile station associated with the customer.

The above general aspect may include one or more of the following features. The outcome of the attempted change of the operational control parameter of the customer's mobile station may identify that the attempted change of the operational control parameter of the customer's mobile station was successful. The attempted change of the operational control parameter of the customers mobile station may lock the customer's mobile station. Locking of the customer's mobile station may prevent access to personal data of the customer stored in the customer's mobile station. The attempted change of the operational control parameter of the customer's mobile station may turn a built-in camera of the mobile station On or Off. The attempted change of the operational control parameter of the customer's mobile station may turn a Wi-Fi capability of the mobile station On or Off. The attempted change of the operational control parameter of the customer's mobile station may be directed toward troubleshooting the mobile station. The attempted change of the operational control parameter of the customer's mobile station may wipe out the content of the mobile station. The wiping of the content of the customer's mobile station may prevent access to personal data of the customer stored in the customer's mobile station. The outcome of the attempted change of the operational control parameter of the customer's mobile station may identify that the attempted change of the operational control parameter of the customer's mobile station was unsuccessful.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3C illustrates an Automated Customer Service System ("ACSS") user interface utilized by the user to change the operational control parameter of the mobile station.

FIG. 3D illustrates a PDS user interface used by the CSR to change the operational control parameter of the mobile station.

FIG. 6A illustrates an exemplary request from a front end application for locking operation.

FIG. 6B illustrates an exemplary SMS message that the customer receives after the lock operation is completed.

DETAILED DESCRIPTION

Figure 1:
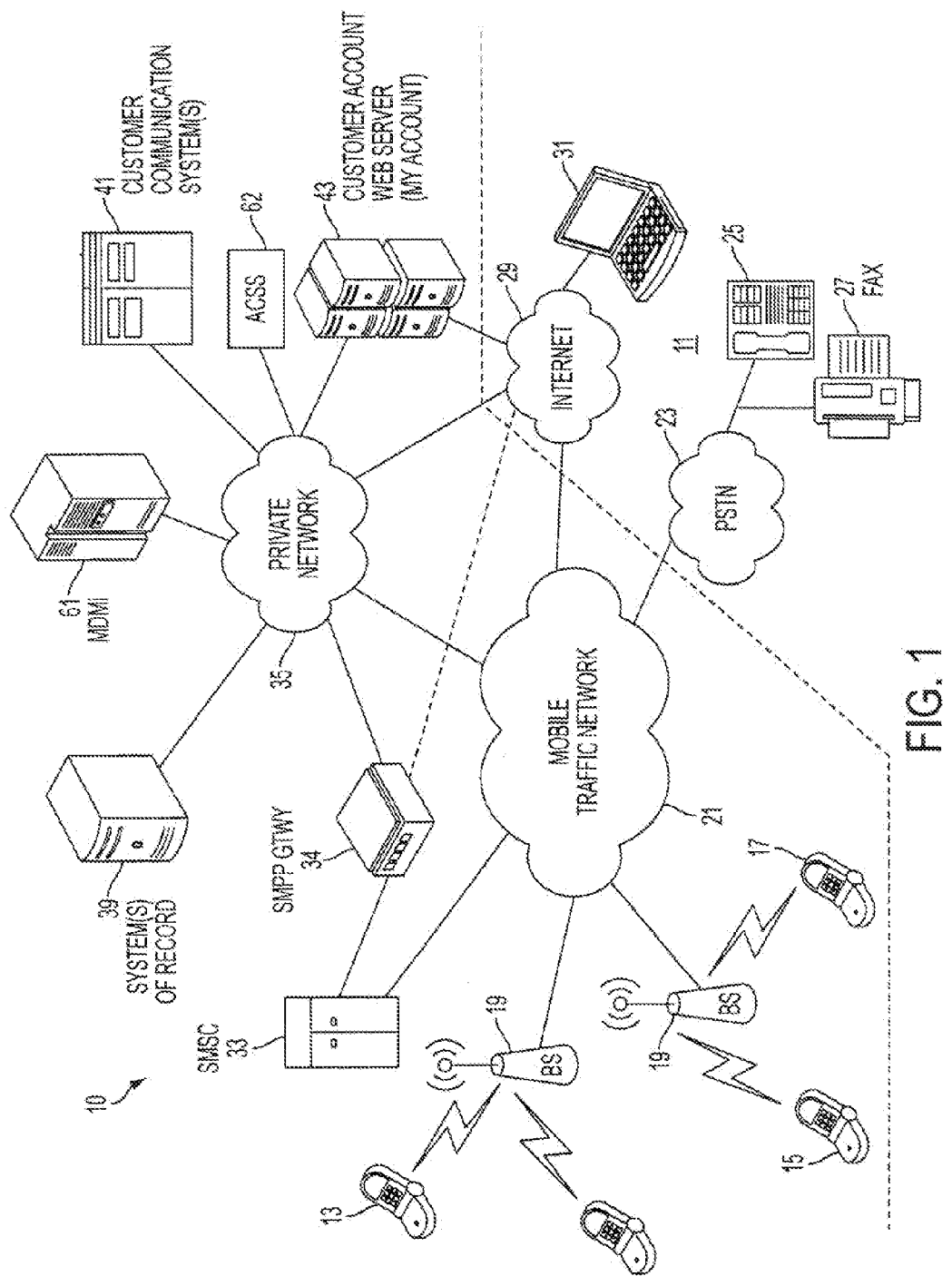
FIG. 1 illustrates a functional block diagram useful in understanding networked elements/systems that may be used in causing a Subscriber Device Management ("SDM") application to change an operational control parameter of a user's mobile station and notify the user of the same via another related mobile station.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subscriber Device Management ("SDM") is a client application that remotely manages settings, configurations, and connectivity via Over-the-Air ("OTA") exchanges of a device (e.g., mobile phone) or the like. When a device has the SDM application, a Customer Service Representative ("CSR") can access the phone remotely. SDM may come pre-loaded on a mobile device. The mobile service provider manages SDM device data through the use of features. When a phone is provisioned on the mobile service provider network, an SDM feature will be added to the device profile as an indicator that the device has the SDM client. This new feature gives the customer service and technical support representatives the ability to make changes remotely to the device.

This ability can shorten the duration of support calls by avoiding lengthy and error prone user interactions where the CSR talks the user through an action via the device user interface ("UI"), the customer reads back a configuration parameter to CSR, and CSR talks the user through entering the correct information on the device etc, until an issue is successfully resolved. With this feature, the support staff also can obtain faster access to more accurate and richer set of data to help with their troubleshooting, and remotely update the device with accurate information. Overall, SDM improves the customers support experience and shortens the support call duration. Shortening the duration of support calls also translates to cost savings for the mobile service provider. This capability could also lead to full customer self service for initial troubleshooting and diagnostics, even repairs, in the future via web portal to reduce the number of service calls.

To illustrate a few examples, the SDM enable locking the mobile station when the user loses his or her mobile station. That is, if a customer suspects that his or her station is lost or stolen or if a device cannot be located, the customer cart request that a CSR lock or partially lock the device to prevent an unauthorized use and to protect the privacy of their personal data. For another example, the SDM remotely enables Wi-Fi or camera On/Off operations of the user's mobile station. This ability helps to reduce the amount of time between the CSR and customer that is needed to find and read out the appropriate settings. Upon successful change (e.g., locking, partial locking, turning on/off camera) of the user's mobile station, SDM provides notification of the change of the operational control parameter through the mobile communication network to another mobile station associated with the customer. For example, SDM enables sending a mobile messaging service message to another mobile station when the above-requested lock operation is accomplished. The user can identify within his profile another number to which the SMS notification message can be sent. Then once the mobile phone, for example, is locked, the SMS message will be sent to that number. This is an improvement over the prior art because previously the user had to wait to receive this change notification information via mail or e-mail.

With this overview, the SDM and notification will be described in more detail respect to the following figures. FIG. 1 illustrates a functional block diagram useful in understanding networked elements/systems that may be used in causing SDM application to change an operational control parameter of the user's mobile station and notify the user of the same. A mobile communication network 10 may be operated by a carrier or service provider to provide a wide range of mobile communication services and ancillary services or features its subscriber customers and associated mobile station ("MS") users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations within networks and stations 11 outside the mobile communication network 10.

For purposes of later discussion, several mobile stations appear in the drawing, to represent examples of the mobile stations that may receive various services via the mobile communication network 10. Today, mobile stations typically take the form of portable handsets, smart-phones or personal digital assistants, although they may be implemented in other form factors. For discussion of some of the notification scenarios, we will assume that the mobile stations 13, 15 and their associated MDNs are all covered under one subscriber account, and that among those stations, the mobile station 13 is the station of the account holder ("AH").

The network 10 allows users of the mobile stations to initiate and receive telephone calls to each other as well as through the public switched telephone network ("PSTN") and telephone stations connected thereto. The network 10 allows SMS type text messaging between mobile stations and similar messaging with other devices via the Internet. The network 10 typically offers a variety of other data services via the Internet, such as downloads, web browsing, email, etc.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements, such as the MMSCs. A regional portion of the network 10, such as that serving mobile stations 13, 15 will typically include one or more RANs and a regional circuit and/or packet switched network and associated signaling network facilities.

Physical elements of a RAN operated by one of the mobile service providers or carriers include a number of base stations represented in the example by the base stations (BSs) 19. Although not separately shown, such a base station 19 typically comprises a base transceiver system ("BTS") which communicates via an antenna system at the site of base station and over the airlink with one or more of the mobile stations 13, 15, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 between the base stations and other elements with or through which the mobile stations communicate. Individual elements such as switches and/or routers forming the traffic network 21 are omitted here for simplicity.

A Mobile Directory Number ("MDN") or Mobile Telephone Number ("MTN") is the telephone number assigned to a mobile station, which a calling party or device inputs in order to call or send a message to the particular mobile station. To call the mobile station 15, for example, a use of a PSTN telephone or of another mobile station dials the MDN associated with the mobile station 15. To send a MMS message or a SMS message to destination mobile station 15, as another example, typically entails input of the MDN of that mobile station. A Mobile Identification Number ("MIN") is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations and is the number or address of the mobile station that appears in billing and account records and is accessible via web site or call-in account services.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or FAX machines. The drawing shows one FAX machine 27, by way of example, to illustrate the point that a subscriber or account holder notification may entail a facsimile transmission of the notification message to the subscriber's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, email, web surfing or browsing, programming and media downloading, etc. For example, the mobile stations may be able to receive messages from and send messages to user terminal devices, such as personal computers, either directly (peer-to-peer) or via various servers (not, separately shown). The drawing shows one such user terminal device as a personal computer ("PC") at 31, by way of example. For purposes of discussing notifications, some notifications may entail an email message transmission of the notification to the subscriber's data terminal, such as to the PC 29 via the Internet 29.

Wireless carriers developed the short message service ("SMS") to transmit text messages for display on the mobile stations. In many existing network architectures, the SMS traffic uses the signaling, portion of the network 21 to carry message traffic between a Short Message Service Center ("SMSC") 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33.

Of note for purposes of this discussion, the system 10 supports service or account related notifications to end users, for SDM related change notifications and for a variety of other notifications that the service provider may want to send its customers. Many of the notifications herein are sent to various mobile stations using SMS capabilities of the network 10. For example, when there is a chance in a subscriber's account warranting notification, then the network 10 will provide an appropriate notification in the form of an SMS message sent via the SMPP gateway 34, the SMSC 33, the traffic network 21, one of the base stations 19 and a signaling channel over the air link to the mobile station 13 of the subscriber/account holder. For some notifications, the system 10 may determine if the SMS transmission successfully provided notification to the mobile station 13, and if not, initiate one or more alternative notification procedures to other destinations designated for possible notice to the particular subscriber/account holder. These messaging capabilities also provide transport for notifications of SDM related changes.

The carrier will also operate a number of systems that provide ancillary functions in support of the communications services provided through the network 10, and those elements communicate with other nodes/elements of the network 10 via, one or more private IP type packet data networks 35 (sometimes referred to as an Intranet). The support elements, for example, include one or more systems of record, such as the system shown at 39. An example of such a system 39 is a billing system, which includes subscriber account records. A large carrier typically has a number of such systems, and the system that stores the account data for a particular subscriber may be referred to as the "system of record" for that subscriber's account.

The exemplary network 10 also includes a customer communications system 41, which is coupled for communication via the private network 35. The customer communications system 41 receives notification requests from various other carrier systems and generates and sends the requested notifications. In some cases, the system 41 also updates information in system(s) of record, as part of its processing in response to the notification requests.

At least some notification requests may be generated upon change to an operational control parameter of the customer's mobile station. For example, the change may include locking or partial locking, the mobile station remotely or turning the camera on/off on the mobile station remotely. The customer communications system 41 may generate and send SMS messages, typically including at least one to the mobile station 13 designated as that of the account holder, in response to such a change in the examples discussed in more detail below, the customer communications system 41 also supports alternative messaging, for example, in the form of facsimile, voice or email messages, and/or letter mailings which are used for changing an operational control parameter of the customer's mobile station.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'My Account' (Now My Verizon) type subscriber interface via the Internet. Hence, a user's terminal, such as PC 31, may be used to access on-line information about a subscriber's account, which the mobile carrier makes available via the carrier's My Account web site accessible through the Internet 29. Of note for purposes of the present discussions of notifications, the web site provides secure user access to enter and/or otherwise change various aspects of the subscriber's account related information. The website also may allow the subscriber to designate the MDN for the account holder's mobile station 13 and/or an MDN of a device to receive notification of a SDM related parameter change.

With that overview of the system, it may be helpful now to consider a high-level discussion of an example of a change to an operational control parameter of the customer's mobile station and attendant notification and update, including how these services might appear from the user or subscriber's point of view. The management of SDM feature resides in the customer-facing service layer, which consists of My Account and Automated Customer Service System ("ACSS") server. The SDM-capable mobile stations may be pre-loaded with proper SDM client application and provisioned via a Mobile Device Management infrastructure ("MDMi") server 51.

The MDMi server 51 communicates with the SDM client on the mobile station (e.g., mobile station 13) to implement the operational control parameter change thereto. The MDMi server 61 may be indirectly accessed by the customer or the CSR. For example, the customer may indirectly access the MDMi server 61 via My Account or My Business application on the website server 43. The My Account application allows customers to perform self-service functionality on their accounts and may be accessed via the personal computer 31. The My Business application allows business customers to perform self-service functionality on their accounts.

In one specific example, a customer calls a CSR for mobile issues (e.g., to change or configure an operational parameter of a mobile station). The call may be from the mobile station or from another telephone. The CSR or the Interactive Voice Response ("IVR") will explain the SDM benefits and ask the caller to accept the SDM profiling session for example, press 1 for yes and press 2 for no). Assuming that this action is performed by the IVR, the acceptance (or rejection) information will be passed to CSR. If it is accepted, the next available CSR will initiate the SDM profiling. The CSR may perform the SDM profiling through ACSS server 62, which provides a front-end application to indirectly access the MDMi server 61.

After the CSR initiated an SDM profiling, an UI screen will be sent to the user asking for permission for profiling his/her mobile. The customer can either accept or reject the SDM profiling. This process may occur every time the user calls the CSR for help on the user's mobile station. It the user accepts the SDM profiling, the CSR can query and read SDM parameters and write certain parameters to perform troubleshooting and make corrections. If the CSR finds any parameter or setting is incorrect and needs to be corrected, before he/she make a correction, an UI screen may appear asking the permission to overwrite the Incorrect parameters or settings. The user can either accepts or rejects the proposed correction.

Should the user reject the SDM profiling, the CSR can only lead the user step-by-step manually to troubleshoot the device. If the CSR finds any incorrect parameters or setting, be/she can suggest the user to make a change. The user can elect to accept or reject the CSR's suggestion. If users have their My Account set up properly, they can use My Account portal via the web to perform a change to an operational parameter of the mobile station instead of using the CSR.

My Account, for example, provides control over the partial locking and unlocking, operation of the mobile station. The User's acceptance or rejection of SDM services at any time will not affect the user's ability to exercise these options. Additionally, should the user reject the SDM service during a troubleshooting call, the action will not affect the presence of the SDM application on the mobile device. My Account, however, does not control all of the operational parameters of the mobile station. For example, My Account may not have the control over built-in camera on/off or Wi-Fi radio on/off.

The subscriber may use the PC 31 (or web enabled mobile station, etc.) to log-in the subscribers account via, the site offered by the server 43 to chance the operational parameter of the mobile station (e.g., partial locking of the mobile station). In operation, the subscriber would use their User ID and a password to log onto their own account page at the carriers website, after which, the subscriber can revise existing operational parameter of the mobile station.

Once the operational change is made to the mobile station, the MDMi server 61 sends a notification request to the customer communications system 41, which will cause the system 41 to send one or more notifications. The CCC request processor in customer communications system 41 may initially generate an SMS message to notify the subscriber. The SMS message may be sent to a previously designated account holder MDN. Alternatively or additionally, the SMS message may be sent to an MDN of the mobile station in which the operational control parameter was changed. Alternatively or additionally, the SMS message may be sent to an MDN associated with another mobile station. This latter feature enables promptly notifying the user of the changes made to the user's mobile station in cases where the user's mobile station is lost or stolen, which is an improvement over the prior art because previously the user had to wait to receive such information via mail or e-mail.

The CCC may glean the information identifying the destination of the SMS message from the subscriber's record stored in server 39 or the subscriber's preferences 59. For example, the subscriber may identify within his profile another number to which the SMS message can be sent and then once subscriber's phone, for example, is locked, the SMS will be sent to that number. To illustrate further, the subscriber may request that the SMS message be sent to the subscriber's relative mobile station when the subscriber's mobile station is locked, for example. The CCC may receive the information identifying the destination of the SMS message directly from the subscriber during the request for the operational change to the mobile station.

Figure 2:
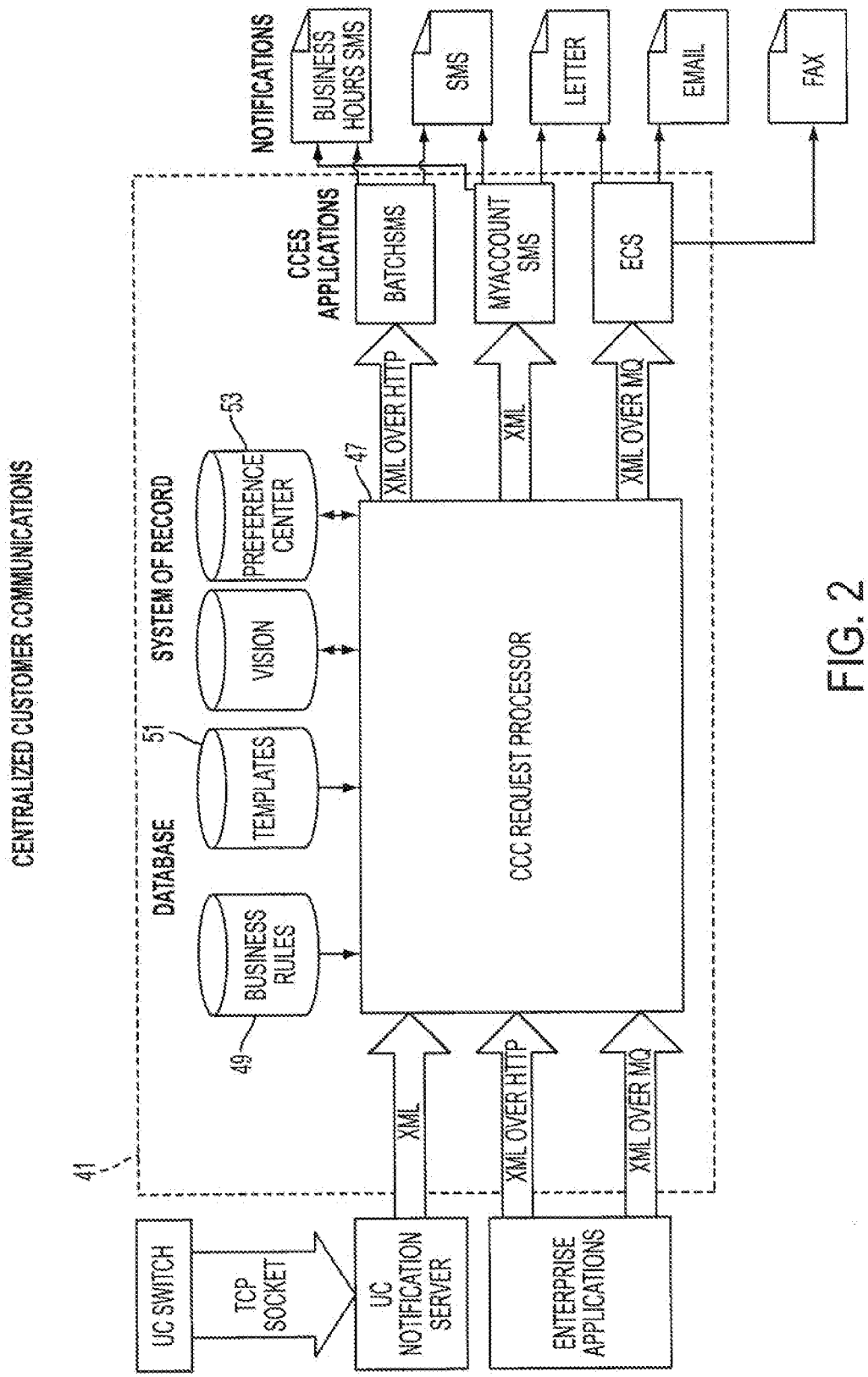
FIG. 2 illustrates software and associated functionalities, in block diagram form, where the software may be run on the hardware of one or more host or server type computers or systems of such computers, to implement a customer communication system shown in FIG. 1.

FIG. 2 depicts software and associated functionalities, in block diagram form, where the software may be run on the hardware of a host or server type computer or system of such computers, to implement the customer communication system 41; and that drawing illustrates several other elements that communicate with that system for providing notifications to mobile users, including those provided when there is a change in an operational control parameter of the mobile station via the SDM application. For example, the drawing shows the systems of record 39 and 53, in this case the billing system 39 and the preference center 53 the example, the customer communication system is implemented as an enterprise middleware web service written in Java that receives notification requests in the form of XML via HTTP or MQ, and follows business rules to send customer notifications and update systems of record. In general these communications may utilize the CCES web services to facilitate the sending of text message, Email, letter, and fax notifications. Hence, the customer communication system 41 may be implemented as middleware, that is to say, in this example, as software for implementing a CCC notification request processor 47, one or more databases 49 and 51, and a directory 53, as will be discussed in more detail below.

Although shown as a common platform at 41 in FIG. 1, the elements of the customer communication system 41 of FIG. 2 may be implemented on separate hardware communicating with each other via a network the same as or similar to network 35. For example, one or more of the databases 49, 51 and 53 typically will be implemented as separate servers in communications with the hardware platform(s) implementing the CCC notification request processor 47, although the databases may be implemented as records and appropriate application software running on the same computer as the middleware for the CCC notification request processor 47. The preference center directory 53, for example, may be implemented as a LDAP server coupled for communication with the computer running the CCC notification request processor 47 programming.

The CCC notification request processor 47 receives notification requests, processes them and provides the processed requests to associated messaging applications that send the desired notifications out via one or more delivery techniques. In the illustrated implementation, the CCC notification request processor 47 provides such notification services for a number of enterprise applications, particularly account change notifications. For example, enterprise applications such as My Verizon running, on the web server 43 may trigger notifications of certain activities on a subscriber's mobile station, such as when a customer uses the on-line Web service through server 43 to change the operational control parameter on the subscriber's mobile station. In any such ease, the CCC request processor 47 will send a notification to the customer following specific notification logic and provide fallout files by area when the notification cannot be made.

The customer communication system 41 will include or have communication access to a number of databases that store information used in performance of various notification related functions, in the example, the customer communication system 41 includes a database 49 of business rules and a database 51 of notification message templates. The rules in the database 49 provide the logic for determining what notifications to send in response to the various Customer Propriety Network Information ("CPNI") changes made on enterprise applications. The rules in the database 49 also provide the logic for determining what notifications to send in response to the various SDM related changes to the mobile stations. The template database 51 provides the format and common content, e.g., forms or templates, for the various notification messages sent out by the system 41.

The Preference Center is the system of record for communication preferences and account holder designation. Communications with this system of record 53 provide the CCC request processor 47 with information that is useful in processing of various notifications, including notifications regarding account. The systems 53 and 41 communicate using XML, via the network 35, to store and retrieve the preference and account holder data from system 53.

Thus, the preference center directory 53 stores preference data regarding notifications for various network customer accounts that may be subject to notifications. The preference center directory 53, for example, stores the MDN of the account holder as designated by the subscriber. Similarly, the preference center directory 53 may store the MDN of the mobile station on which the subscriber would like to receive the SDM related change notifications. The directory may store other notification preference information for the subscriber account, for account change notifications and/or for other notifications that the carrier may want to provide to the subscriber, such as for example, notification related, to a change in operational control parameter of the customer's mobile station. The language for the notification also may be specified by a field, e.g., as provisioned in the web server. The CCC request processor 47 communicates with the Preference Center application that updates its directory 53 using the Lightweight Directory Access Protocol (LDAP).

The customer communication system 41 also runs one or more message output applications, identified as CCES applications in FIG. 2, for processing the notification request messages output from the CCC notification request processor 47, as needed to generate and send the actual notification messages through one or more communication delivery channels. The CCC notification request processor 47 modifies notification request messages based on its processing and outputs the modified notification request messages in XML format to the appropriate one or more of the CCES applications, to send the actual notifications. The CCES applications comprise application programming software, which may run on the same or a different computer from the CCC notification request processor 47.

The CCES applications enable the customer communication system 41 to provide notifications, including notifications regarding account changes, and notifications for changes to operational control parameters of the mobile station, using a number of communication techniques, as shown by way of example to the right of FIG. 2. Some messages may be batch processed for SMS communications or sent in real time in response to triggering events as represented by the My Account SMS processing in the drawing. Batch SMS communications may be limited to business how's if desired or sent at any time of the day. Event responsive notifications, such as those for the account change notifications, would be sent in real-time as the change events are detected and processed through the customer communication system 41. The customer communication system 41 also supports other types of notifications, such as email, letter, or facsimile transmissions via an Enterprise Communication Services ("ECS") function.

The customer communication system 41 could be implemented on a single hardware platform. However, to provide effective notification services for a large number of customers and a large volume of trigger events or enter rise applications requiring notification, including various account data changes, the customer communication system 41 may utilize a distributed system architecture. The exemplary system architecture will be highly available and fault tolerant. Those skilled in the art will recognize, however, that other system architectures may be used e.g., to meet the demands of increased event and notification traffic for account changes and/or other enterprise applications that require customer notifications.

The CCES software for notification services may be written in Java. Each CCES Notification Server node in the example has an instance, of Websphere running the CCES notification software and the CCC/MyAccountSMS software on the same Java Virtual Machine ("JVM"). This allows the account change notifications to utilize all of the features of the customer communication system including; SMS notifications, EMS notifications, Email notifications, fax notifications, letter notifications, notification templates, rules based failure notifications, preference center lookups, and weekly reports. EMS (Enhanced Messaging Service) is an application-level extension to Short Message Service (SMS) for cellular phones available on GSM, TDMA and CDMA networks. The CCC software, for example, makes the preference center lookups on the account number provided in the notification request to send SMS notifications to the Account Holder. The CCC software also updates preference center records for subscribers to reflect account changes, responsive to the account registration and change notification requests.

Figure 3A:
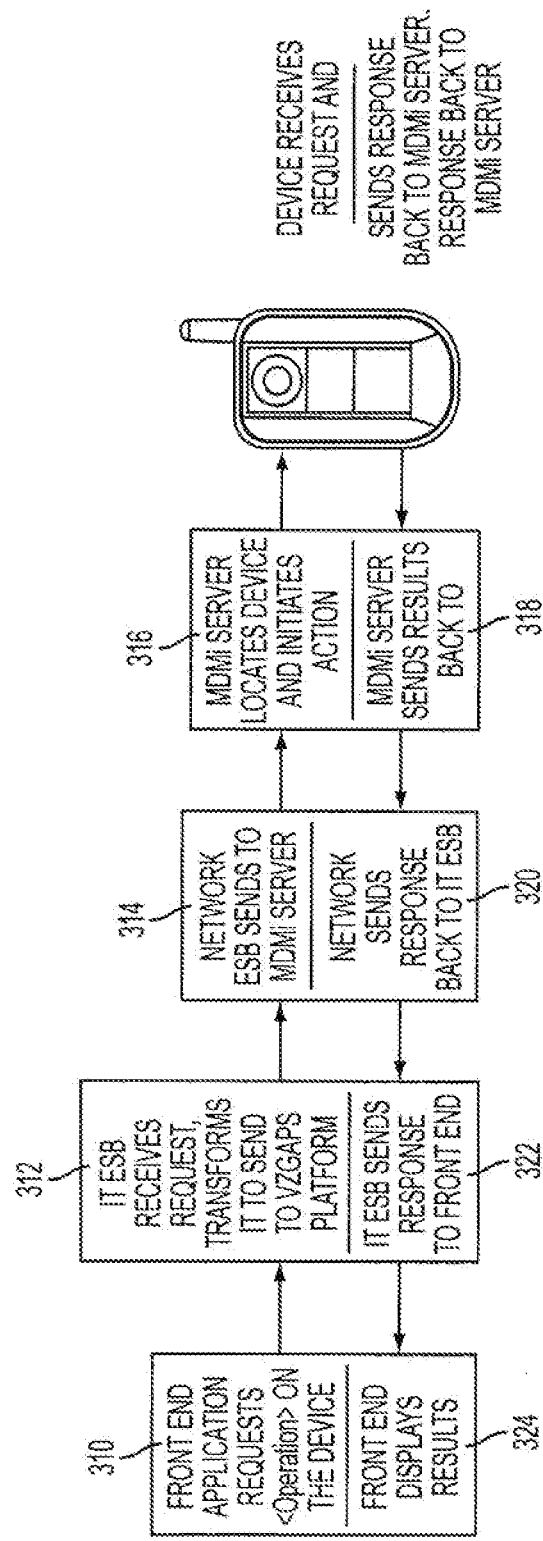
FIG. 3A provides a high level illustration of a flow for an example of a change to an operational control parameter of a mobile station, as might be implemented in the system shown in FIG. 1.
Figure 4:
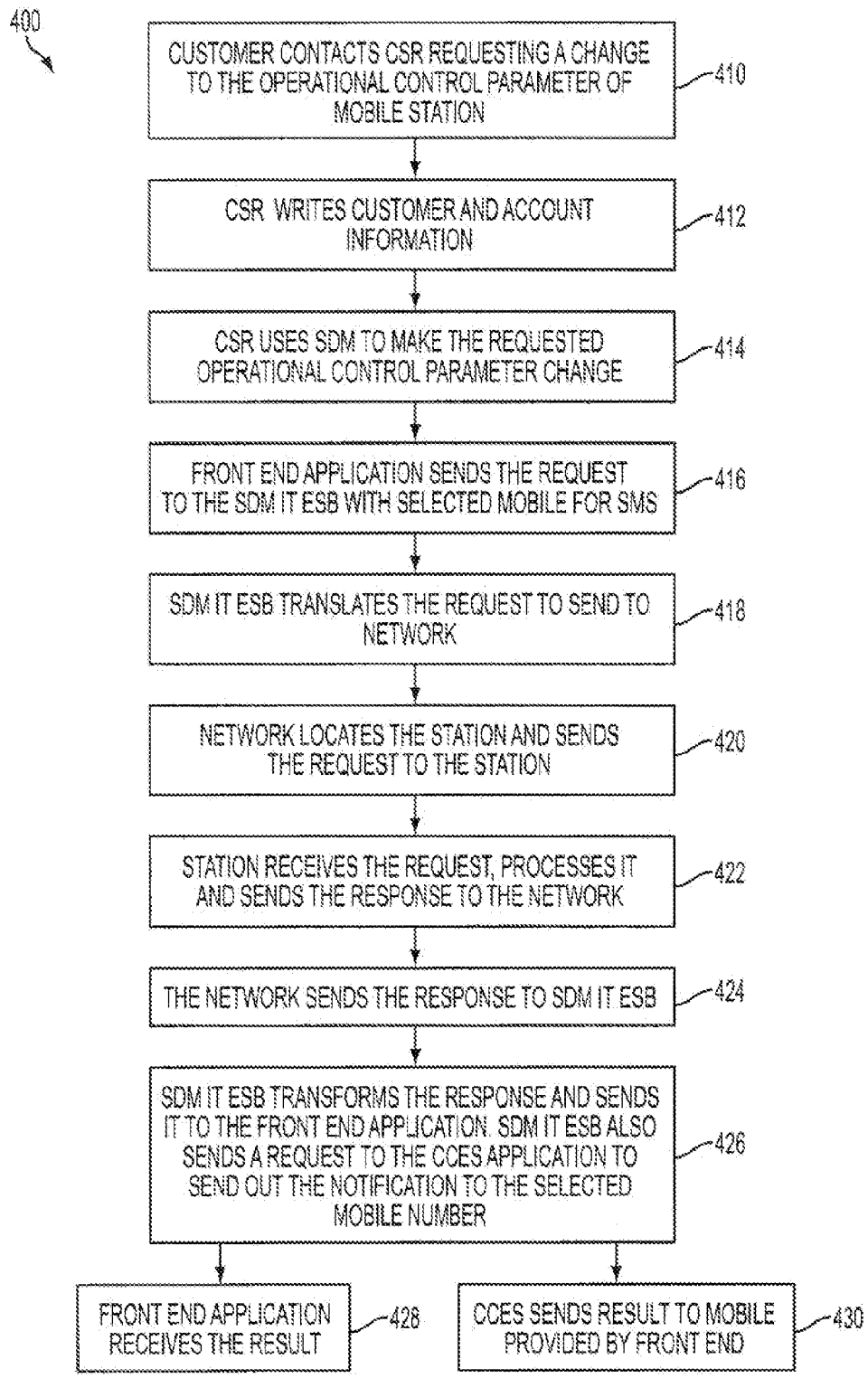
FIG. 4 illustrates a somewhat more detailed example of a procedure like that of FIG. 3A.

The flow chart of FIG. 3A provides a high level illustration of a flow for an example of a change to an operational control parameter of a mobile station, as might be implemented in the system 10. FIG. 4 shows a somewhat more detailed exemplary procedure. As noted above, the subscriber can utilize the My Verizon web site functionality via the server 43 to change the operational control parameter of the mobile station or can implement such as change via the CSR, although in this example some of the changes may only be implemented via the CSR such as, for example, turning the built-in camera on/off or turning the Wi-Fi on/off. The changes to the operational control parameter of the mobile station may include full/partial locking, unlocking of the mobile station, wiping out the content of the mobile station, turning on/off the built-in camera or the Wi-Fi of the mobile station. In one implementation, when the CSR, is utilizing the SDM application to change configuration of the mobile device, only the pertinent device and application configuration parameters are intended to be viewable by the CSR. For example, no user generated content such as, for example, contact information, messages, e-mails, pictures or video can be accessed or viewed by the CSR.

Figure 3B:
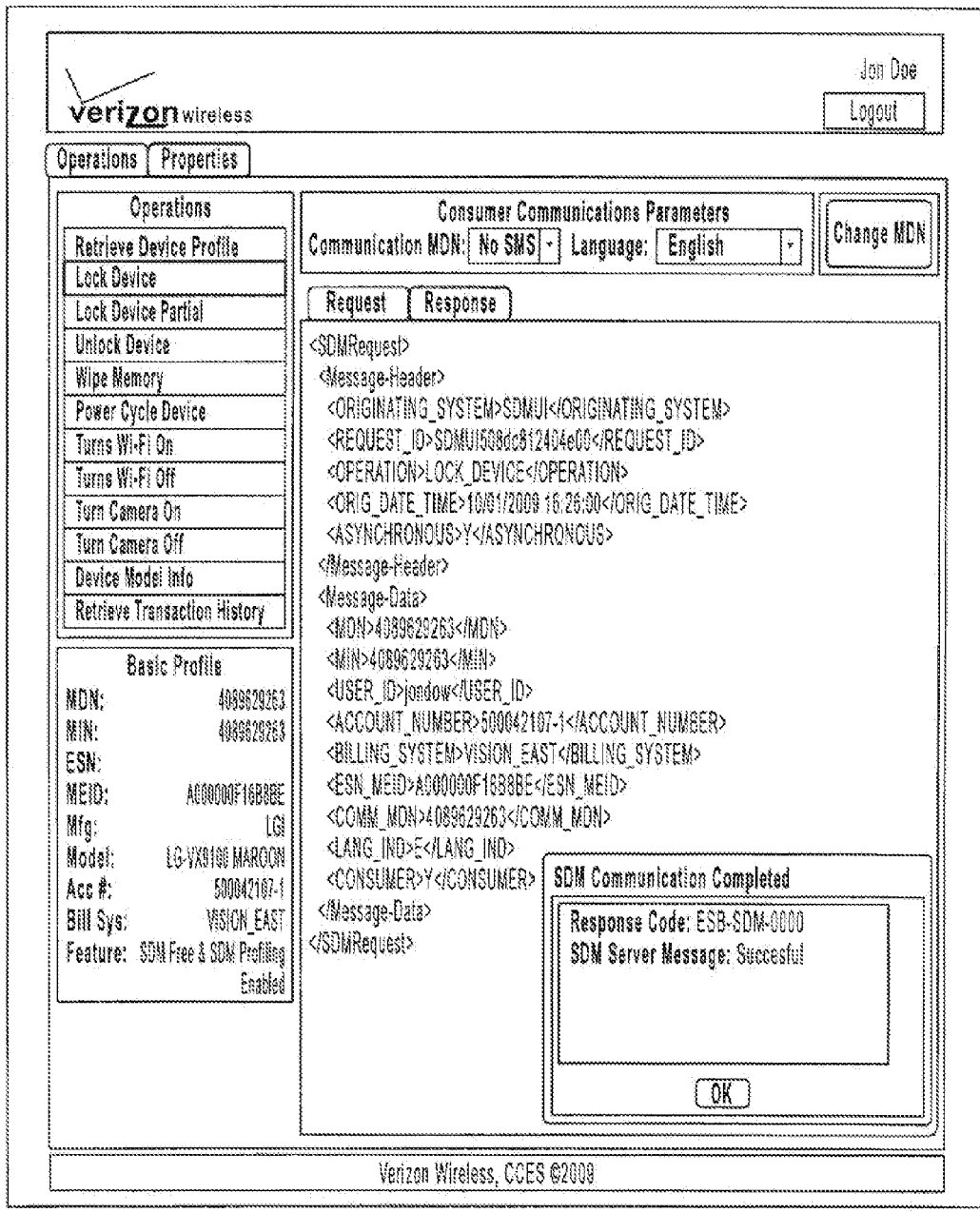
FIG. 3B illustrates a SUM user interface used by Customer Service Representative ("CSR") to change the operational control parameter of the mobile station.
Figures 3C, 3D:
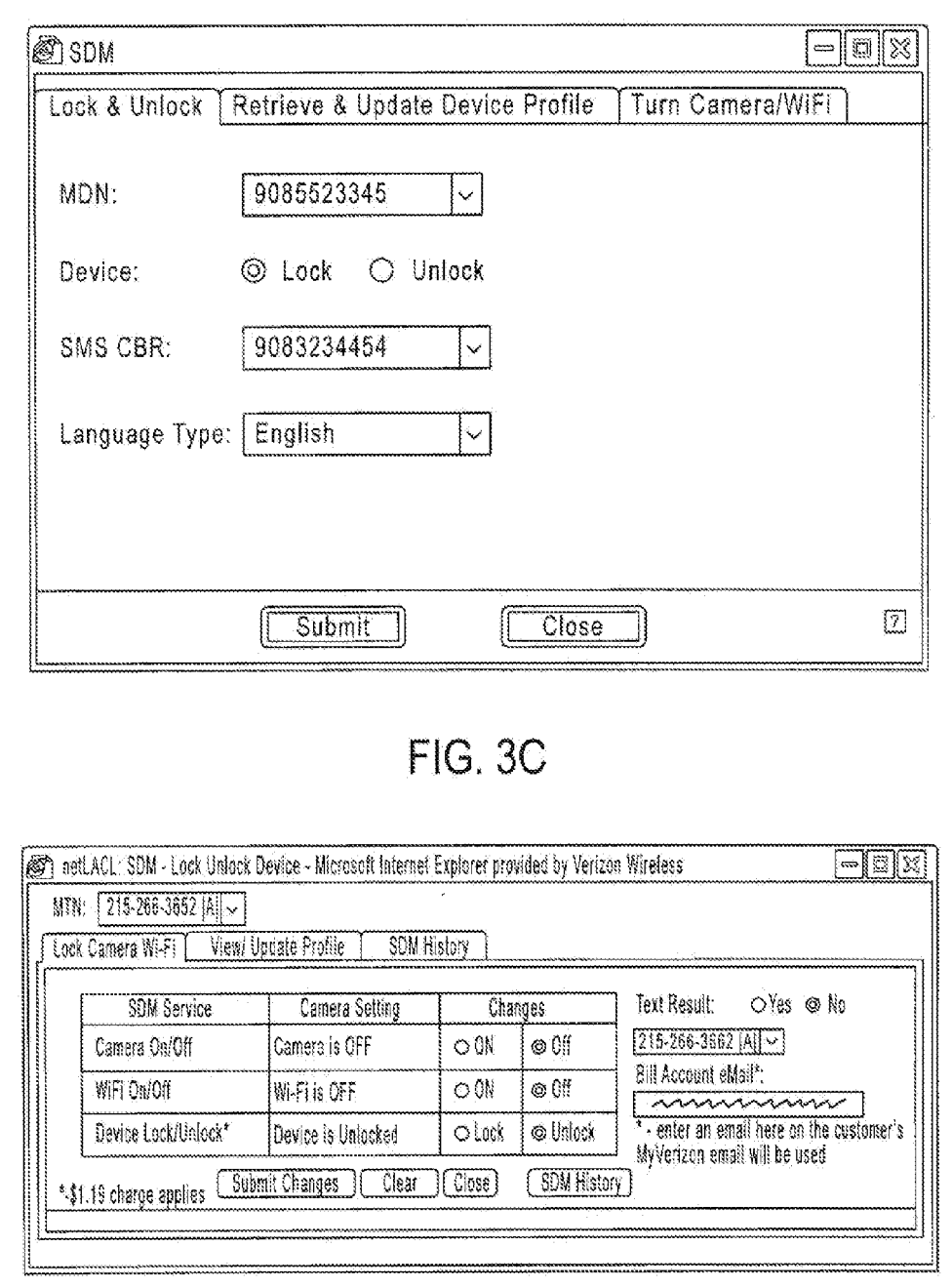

When a user calls a CSR with a mobile station related issue or because the user has lost the mobile station, the CSR who is assisting the user will obtain the user's permission to initiate a call to the mobile station to perform one of many available operations. The CSR may solicit this permission via a front end application such as, for example, Point of Sale ("POS"), ACSS, or SDM user interface. FIG. 3B illustrates a SDM user interface used by CSR to change the operational control parameter of the mobile station. FIG. 3C illustrates a ACSS user interface utilized by the user to change the operational control parameter of the mobile station. FIG. 3D illustrates a POS user interface used by the CSR to change the operational control parameter of the mobile station.

Once the front end application receives the request, it submits the request to the SDM IT Enterprise Service Bus ("ESB") (310). The SDM IT ESB will transform the request to send it to VZGAPS platform (312). For example, the SDM IT ESB transforms the request front XML ever HTTP into XML over MQ and sends it to network. The network receives the request and forwards it to the MDMi server 61 (314), in response, the MDMi server 61 locates the mobile station and initiates action (316). For example, if the request is to lock the mobile station, the MDMi server 61 performs the lock Operation. The MDMi server 61 sends the result back to the network (318), which in turn forwards the response to the SDM IT ESB (320). The SDM IT ESB then sends the response back to the requesting front end application (322), which displays the result to the user (324).

As shown in FIG. 1 multiple front end applications will offer this service to the mobile service provider's customers. In one example, the ACSS application 62 is used by the customer hieing personnel. The My Account 43 is a self-service vehicle that the mobile service provider provides to the customers to take care of the requests without having to interact with the CSR.

FIG. 4 illustrates a somewhat more detailed procedure for changing the operational control parameter of a mobile station, as might be implemented in the system 10. The process 400 begins with the customer contacting the CSR and requesting a change to an operational control parameter of the mobile station (410). The change to the operational control parameter may include for example partial/full locking, unlocking, of the mobile station, turning the built-in camera or the Wi-Fi on/off, and/or wiping the data inside the mobile station. Alternatively, the change to the operational parameter may include one or more changes associated with troubleshooting the mobile station or resetting the mobile station to the original factory setting.

Upon receiving the request, the CSR verifies the customer and account information (412). The CSR confirms that the caller has the authority to make changes on the mobile service provider account. The CSR also confirms that the station has the SDM client and obtains the customer's okay to make the requested changes using SDM functionality. Using the SDM client, the CSR makes the requested operational control parameter change (414). The CSR selects the option best suited towards the customer's needs. For example, if the customer's station is lost or stolen, the CSR would select "Lock" in the front end application as shown in FIG. 3B. Toward this end, the CSR may ask the customer if the customer would like to receive the result of the operation as an SMS message to another mobile number on his/her account. The customer may be pleased with this capability and may respond yes. For example, the customer may respond "Yes, please have it go to my wife's number." In response, the CSR selects "the wife's number" to receive the SMS.

The front end application sends the request to the SDM IT ESB with the mobile number to implement the Lock operation, and the mobile number to receive the notification (416). The mobile number to receive the notification may be included in the transaction. The SDM IT ESB translates the operation request to send to network (418). The network locates the station to be changed and sends the requested operation to the station (420). In one example, the network locates the mobile station via the MDMi server which instructs the mobile station to make the operational control parameter change. The mobile station receives the request, processes it, and sends the response to network (422), which in turn sends the response to the SDM IT ESB (424). The response indicates the operation success or failure.

The SDM IT ESB transforms the response and sends it to the front end application; the SDM IT ESB also sends a request to the CCES application to send out the notification to the selected, mobile number (426). The front end application receives the result (428). The GOES also receives the request and forwards the result to the mobile number provided by the front end application (430). In keeping with the previous example, the CCES forwards the result to the customer's wife mobile number. As such, the customer receives an instantaneous SMS that the operation was successful (or failed) on his wife mobile station. Of course, the CCES can also forward the message to the customer via e-mail or mail. As a result of this operation, the customer is impressed, and happy, to have gotten an automatic update even though his mobile device may not be available to receive the notification. This, for example, helps relieve the anxiety of not knowing who might find the lost phone and have access to his information.

Figure 5:
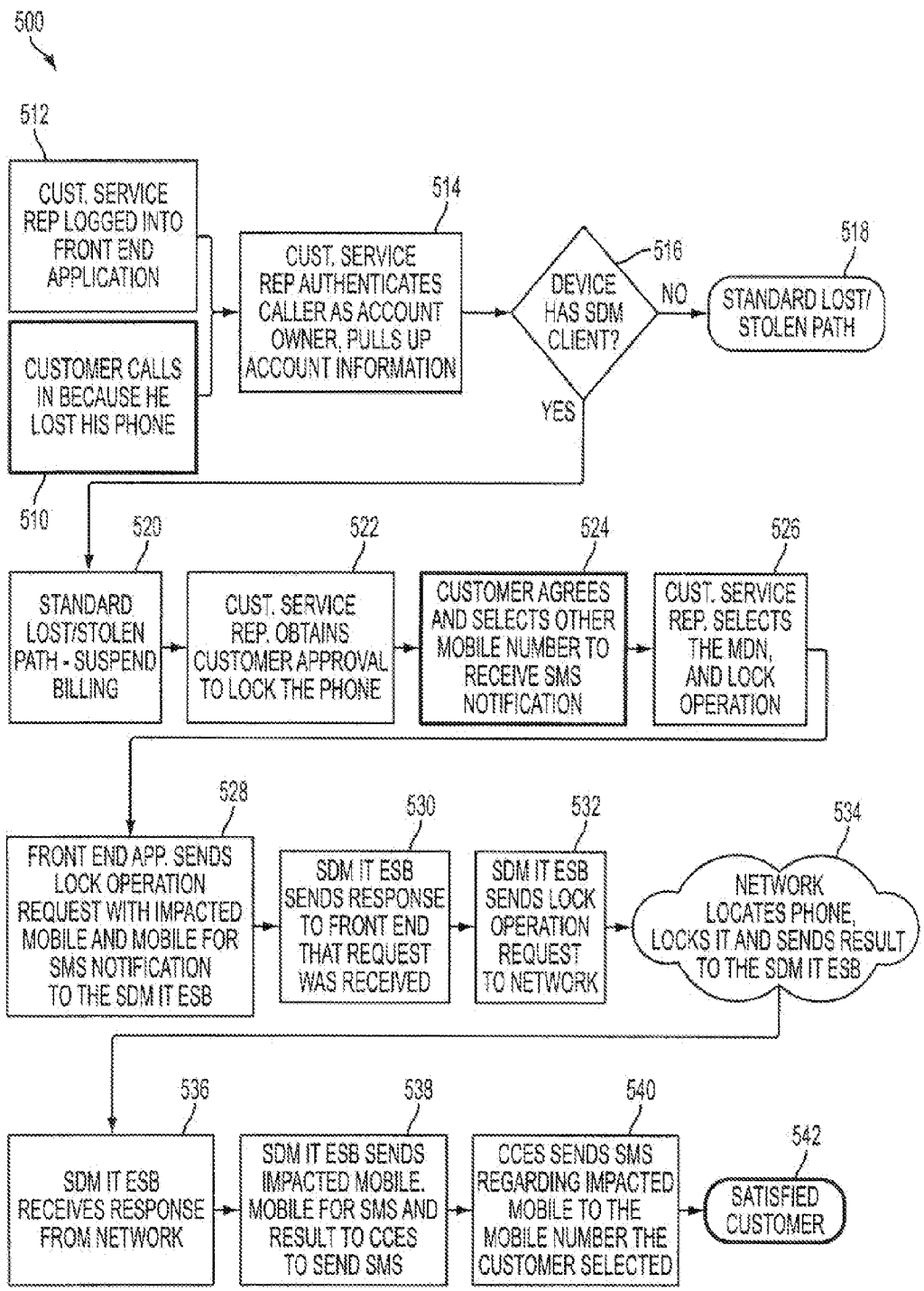
FIG. 5 illustrates a process flow in more detail for a procedure associated with partial locking of the mobile station.

As noted above, one example of the above operational control parameter includes partial luck/unlock of the mobile station. FIG. 5 illustrates an exemplary process 500 that describes in more detail the procedure associated with partial locking of the mobile station. Due to the similarity between partial lock and voluntary suspend, however, this disclosure first provide the summaries for these two features and the differences between them and then describes the partial lock process 500 in detail.

Voluntary suspend is a back-end solution from the network, which blocks the service to the mobile station. A station associated with a suspended account cannot make outgoing calls (except for 911) or receive incoming calls. However, the station is not protected from unauthorized access, if the station is not password protected. If the station does not have password protection, the station content can be accessed by anyone. Additionally, if the station is the primary line in a Familyshare plan, the suspension will affect all lines within this plan.

SDM lock is a device-based feature. A locked device cannot make outgoing calls (except for 911); however, it can receive incoming calls. If a user suspects his/her device is lost or stolen, he/she could elect to partially lock the device to protect the privacy of their personal data and to prevent an unauthorized use. A user can lock his/her device with partial lock, and then call the device and the ringing/vibration may reveal the physical location of the device. A partially locked device can make an emergency call and receive an emergency call back, calls to customer service (611 and *228, for example), receive in-coming calls, and participate in SDM activities.

Key differentiators between the voluntary suspend and the SDM lock is that SDM Lock offers the user a better chance to recover the lost phone by calling the lost device—its ringing/vibration may lead the owner to find it, or a person is taxi driver, a restaurant waiter/waitress, for example) whoever finds it can answer the phone. Additionally, the contents stored in the device built-in memory will be protected from unauthorized access. The voluntary suspend can be used as a last resource, if a device is not reachable by the network to perform lock.

The partially locked device may be unlocked via the unlock feature. The partial lock and unlock operations utilize the standards based approach to first send the device an SMS notification. The device will setup a data connection with the server for a two-way authentication then proceed with the partial lock or unlock operation. When completed, the device will report back to the server with status. If the device fails to establish a data connection to communicate to the server, it will fallback to support a SMS only partial lock or unlock. This approach is to maximize the success rate of the partial lock, and unlock operations for devices without data roaming.

The partial lock operation may be performed by visiting a web portal (e.g., My Account), calling CSR, or seeking in store support. FIG. 5 illustrates a process 500 for performing the lock operation via calling a CSR. The process 500 begins with the subscriber calling a CSR to disable a lost or stolen mobile station (510) with the CSR logged into a front end application (512). The CSR authenticates the caller as an account owner and pulls up account information (514). The CSR identifies whether the mobile station includes a SDM application (516). If not (516, no), the CSR follows the standard lost or stolen path (518). If yes (516, yes), the CSR may suspend the standard lost or stolen path (520) and may instead seek the customer's consent to perform the partial lock using the SDM application (522). For example, the CSR may explain the SDM benefits and ask the caller to agree with making the change through the SDM application. To this end, the CSR may check whether there is a charge to the customer for the partial lock feature. If so, the CSR informs the customer of the same. In one example, the CSR determines that there is a $1.99 charge and informs the customer of the charge, which will appear in his/her monthly bill.

Assume for discussion that the customer agrees with the charge and selects another mobile number to receive SMS notification (524). Once the customer agrees with the charge, the CSR may seek confirmation and the customer again confirms the customer's desire to lock the device at this point in time. In response, the CSR initiates the lock operation and selects the MDN to receive the notification (526). The execution of partial lock functionality may happen silently (user acceptance may not be required).

The front end application sends a lock operation request with the MDN of the impacted mobile station and the MDN of the mobile station selected for SMS notification to the SDM IT ESB (528). FIG. 6A illustrates an exemplary request from the front end application for a locking operation. The SDM IT ESB sends response to front end application that the request was received (530), and sends the request to the network (532). The network receives the request, locates the impacted mobile station, locks the impacted mobile station, and sends the result back to the SDM IT ESB (534). Specifically, the network forwards the instructions for locking the impacted mobile, station to the MDMi server. The MDMi server locates the mobile station and sends instructions to the SDM application of the mobile station to lock the mobile, station. The SDM application receives the instructions, initiates the lock operation, and sends the result (e.g. success or failure) back to the network through the MDMi server.

The SDM IT ESB receives the response from the network (536), and sends the MDNs for the impacted mobile station, and mobile, station for SMS notification to CCES to send SMS (538) and sends the request completion status to the requesting front end application. The CCES sends an SMS notification message regarding impacted mobile station to the mobile number that the customer selected (540). As such, the customer receives an instantaneous SMS message that the operation was successful (or failed) (542). FIG. 613 illustrates an exemplary SMS message that the customer receives after the lock operation is completed. If the partial lock operation is successful, the charge will be placed in the subscriber's monthly bill. In this manner, the user who has lost his/her device can call the lost device and hopefully find the device from its ringing or vibration. Meanwhile the device, contents are protected.

In a slightly different implementation, the CSR front end process determines (per the aforementioned business rules) that subscriber is eligible for free of charge partial lock feature. The CSR informs the subscriber that his/her device can be partially locked free of charge and the resulting effects or a locked device. The subscriber agrees to partial lock the device. The CSR performs the partial lock on the device, and the SDM server confirms the operation. The CSR informs the subscriber that the partial lock operation is successful and informs the subscriber that an email notification will be sent to the account holder and authorized users. CSR also asks the subscriber if he/she wants to send an optional SMS message to another mobile, which is listed, under his/her account if the subscriber has another mobile station listed, he/she can choose one so that an SMS message can be sent to notify the subscriber about the SDM partial lock successful for failed) execution.

The partial lock operation may also be performed through the web portal. For example subscriber can log into My Verizon thorough PC 31 to partial lock his/her device. The subscriber or account holder is properly authenticated to access the account information. Thereafter, the MDN is properly entered for the lost/stolen device. When the subscriber or account holder clicks "Lock" button, the web portal will check the business rules (directly or indirectly via other systems) to determine if this subscriber is eligible for free of charge partial lock feature. An UI screen may display "Processing . . . " In one example, the system determines that this subscriber or account holder is not eligible for free partial lock. An UI screen will display "You are about to Lock your mobile device. This service will charge $1.99 to your monthly bill. Do you accept this charge? Okay or Cancel." If Cancel button is selected, the lock operation will not take place. The subscriber or account holder returns to the previous web page. If Okay button is selected, the system will trigger the partial lock operation at the SDM server, which will perform the partial lock operations. An UI screen may display "Lock in Progress" during the process. After the sum server receives the partial lock successful completion confirmation, an UI screen may display with the transaction confirmation.

In a slightly different implementation utilizing My Verizon, the web portal determines that the subscriber or account holder is eligible for free of charge partial lock feature. An form screen may display "You are about to Lock your mobile device. Okay or Cancel." Similar to the previous example, if Cancel button is selected, the lock operation will not take place. The subscriber or account holder stays in the previous web page. The UI also asks the subscriber if he/she wants to send an optional SMS notification message to another mobile station, which is listed under his/her account if the subscriber has other mobile station listed, he/she can choose one so that an SMS notification message can be sent to notify the subscriber about the SDM Partial Lock successful or failed) execution. If Okay button is selected, the system will trigger the partial lock operation at the SDM server, which will perform the partial lock operations. After the SDM server receives the partial lock successful completion confirmation, an UI screen may display with the transaction confirmation.

As shown by the above discussion, functions relating to the SDM functionality may be implemented on computers connected for data communication via the components of a packet data network as shown in FIG. 1. Although special purpose devices may be used, such devices also may be implemented using, one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for enabling remote change to the operational control parameters of the mobile station using SDM and associated change notification. The software code is executable by the general-purpose computer that fractions as the MDMi 41 server and/or that functions as a mobile station. In operation, the code is stored within the general-purpose computer platform. At other times, however, the software may be stored at other locations and/or transported for loading into the appropriate general-purpose computer system. Execution of such code by a processor of the computer platform enables the term to implement the methodology for managing a customer's mobile station and providing a notification of a resultant change, in essentially the manner performed in the implementations discussed and illustrated herein.

Figure 7:
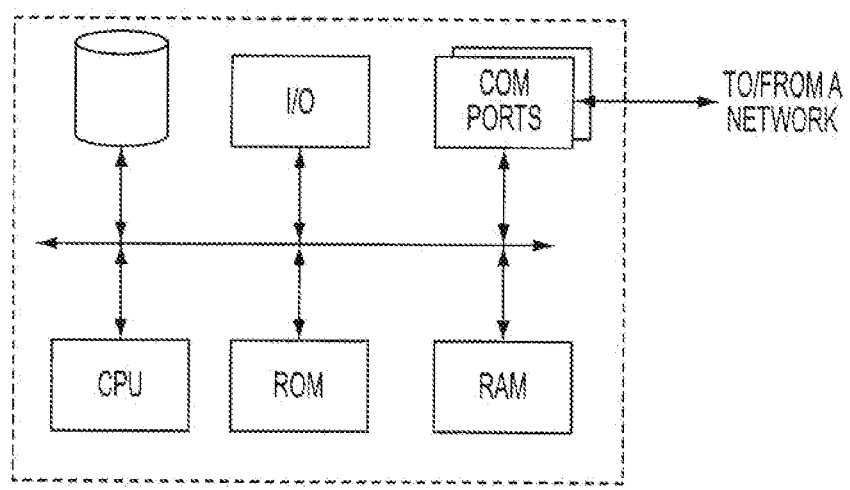
FIG. 7 is simplified functional block diagram of a computer that may be configured as a host or server, for example, to function as the MDMi server in the system of FIG. 1.
Figure 8:
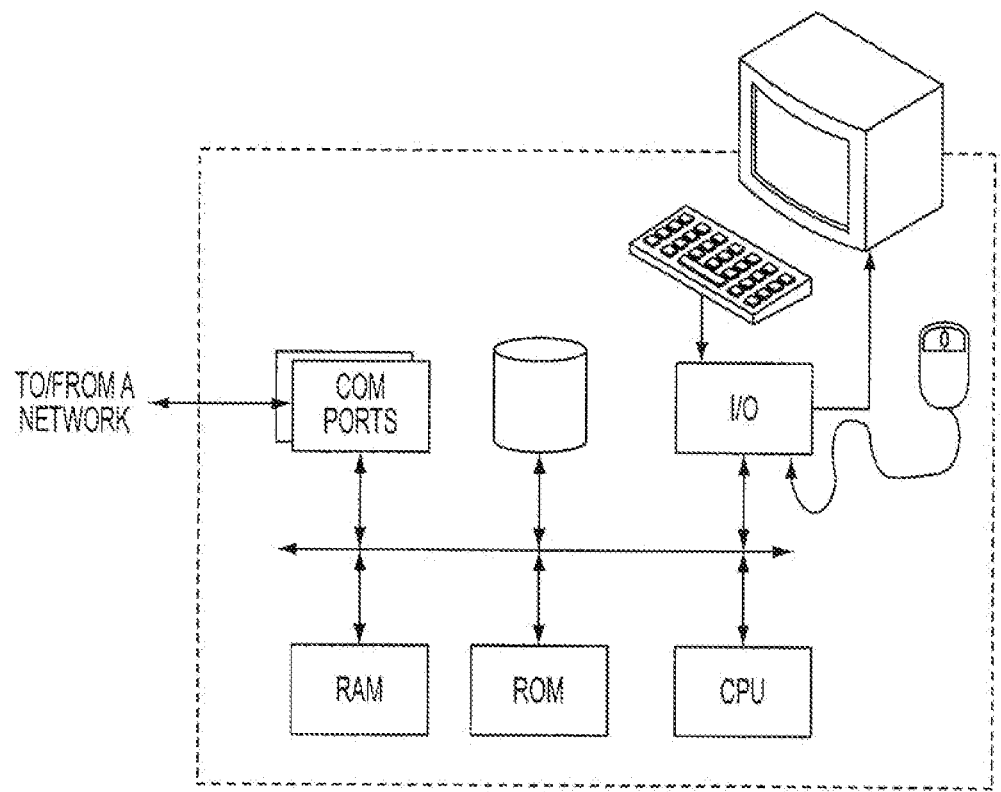
FIG. 8 is a simplified functional block diagram of a personal computer or other work station or terminal device.

FIGS. 5 and 6 provide functional block diagram illustrations of general purpose computer hardware platforms. FIG. 7 illustrates a network or host computer platform, as may typically be used to implement as server. FIG. 8 depicts a computer with user internee elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data, communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating, systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of managing a customer's mobile station and providing a notification of a resultant change outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from as management server or host computer of the network operator into the computer platform of the mobile station and the MDMi server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the SDM functionality shown in the drawings. Volatile storage media include dynamic memory, such as main memory of such a computer platform. Tangible transmission media include coaxial cables; copper wire and fiber optics, including the wires that comprise a bus within a computer system, carrier-wave transmission media can take the form of electric or electromagnetic signals, or acoustic or light waves such as those generated during radio frequency ("RF") and infrared ("IR") data communications. Common forms of computer-readable media therefore include for example: a floppy disk, a flexible disk, hard disk, magnetic tape, any other magnetic medium, a CD-ROM DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying. One or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended lay the following claims to claim any and all applications, modifications and variations that fall within the true scope of the present teachings.

What is claimed is:

1. A method, comprising steps of:
    communicating over the air through a mobile communication network with a subscriber device management application running on a customer's mobile station;
    causing the subscriber device management application to change an operational control parameter of the customer's mobile station, via the over the air communication;
    in response to the change of the operational control parameter of the customer's mobile station, accessing data of a subscriber containing preference information;
    locating in the subscriber data, notification language, wherein the notification language is related to the operational control parameter changed by the subscriber device management application;
    generating, using the notification language, a mobile messaging service message to notify a subscriber of the change to the operational parameter; and
    sending the generated mobile messaging service message containing a notification of the change of the operational control parameter to a mobile directory number associated with another mobile station.

2. The method of claim 1, further comprising:
    retrieving from the subscriber data the mobile directory number associated with the other mobile station.

3. The method of claim 1, further comprising steps of:
    in response to a query, receiving information that confirms a customer has authority to change settings to a mobile service provider account corresponding to the mobile station; and
    prior to sending the generated mobile messaging service message to the mobile directory associated with the other mobile station, obtaining, via a customer input, information sufficient to identify to the mobile service provider the other mobile device.

4. The method of claim 1, further comprising:
    sending instructions causing a user prompt to be presented on a display of a user device, wherein the user device is different from the customer's mobile station and the prompt requests a user input to confirm the change in operational control parameter;
    in response to an input confirming the change of the operational parameter, delivering an instruction to change the operation control parameter to the subscriber device management application on the customer's mobile station; and
    presenting on the user device display a screen indicating confirmation of the change of the operational parameter.

5. The method of claim 4, wherein the user device display is a display on a point of sale device or a display presented on a customer service representative system.

6. The method of claim 1, further comprising:
informing a customer of a mobile service provider via a displayed prompt that the change of the operational control parameter of the mobile station incurs a charge to a bill associated with the customer, the customer associated with the mobile station; and
in response to the prompt, receiving a customer confirmation input that the impending change to the operational control parameter is to be charged to the bill.

7. The method of claim 1, further comprising:
informing a customer of a mobile service provider via a displayed prompt that the change of the operational control parameter of the mobile station is free of charge to a bill associated with the mobile station, the customer associated with the mobile station; and
in response to the prompt, receiving a customer confirmation input that the impending change to the operational control parameter is to be made free of charge.

8. The method of claim 1, wherein the operational parameter change is at least one of a partial lock of the mobile station, a turning On or Off of a Wi-Fi capability of the mobile station, a turning On or Off of a built-in camera of the mobile station, a preventing of access to personal data stored in the mobile station, a wiping out content of the mobile station, wherein the partial lock of the mobile station allows the mobile station to perform one or more of ringing, vibrating, receiving incoming calls, making and receiving emergency calls, and making calls to a service provider customer service.

9. A host system, comprising:
a processing device; and
a non-transitory, machine readable storage medium containing executable program instructions embodied in the machine readable storage medium for execution by processing device, wherein execution of the program instructions causes the processing device to perform functions comprising:
communicating over the air through a mobile communication network with a subscriber device management application running on a customer's mobile station;
causing the subscriber device management application to change an operational control parameter of the customer's mobile station, via the over the air communication;
in response to the change of the operational control parameter of the customer's mobile station, accessing data of a subscriber containing preference information;
locating in the subscriber data, notification language, wherein the notification language is related to the operational change parameter changed by the subscriber device management application;
generating using the notification language a mobile messaging service message to notify the subscriber of the change to the operational parameter; and
sending the generated mobile messaging service message containing a notification of the change of the operational control parameter to a mobile directory number associated with another mobile station.

10. The host system of claim 9, wherein execution of the program instructions causes the processing device to perform functions further comprising:
accessing subscriber data containing user preference information
retrieving from the subscriber data the mobile directory number associated with the other mobile station.

11. The host system of claim 9, wherein execution of the program instructions causes the processing device to perform functions further comprising:
in response to a query, receiving information that confirms a customer has authority to change settings to a mobile service provider account corresponding to the mobile station; and
prior to sending the generated mobile messaging service message to the mobile directory associated with another mobile station, obtaining, via a customer input, the information sufficient to identify of the other mobile device to the mobile service provider.

12. The host system of claim 9, wherein execution of the program instructions causes the processing device to perform functions further comprising:
sending instructions causing a user prompt to be presented on a display of a user device, wherein the user device is different from the customer's mobile station and the prompt requests a user input to confirm the change in operational control parameter;
in response to an input confirming the change of the operational parameter, delivering an instruction to change the operation control parameter to the subscriber device management application on the mobile station; and
presenting on the user device display a screen indicating confirmation of the change of the operational parameter.

13. The host system of claim 12, wherein the user device display is a display on a point of sale device or a display presented on a customer service representative system.

14. The host system of claim 9, wherein execution of the program instructions causes the processing device to perform functions further comprising:
informing a customer of a mobile service provider that the change of the operational control parameter of the mobile station incurs a charge to a bill associated with the mobile station, the customer associated with the mobile station; and
receiving customer confirmation that the impending change to the operational control parameter is to be charged to the bill.

15. The host system of claim 9, wherein execution of the program instructions causes the processing device to perform functions further comprising:
informing a customer of a mobile service provider that the change of the operational control parameter of the mobile station is free of charge to a bill associated with the mobile station, the customer associated with the mobile station; and
receiving customer confirmation that the impending change to the operational control parameter is to be made free of charge.

16. The host system of claim 9, wherein the operational parameter change is at least one of a partial lock of the mobile station, a turning On or Off of a Wi-Fi capability of the mobile station, a turning On or Off of a built-in camera of the mobile station, a preventing of access to personal data of the customer stored in the mobile station, a wiping out content of the mobile station, wherein the partial lock of the mobile station allows the mobile station to perform one or more of ringing, vibrating, receiving incoming calls, making and receiving emergency calls, and making calls to a service provider customer service.

* * * * *